(12) United States Patent
Jackson, Jr.

(10) Patent No.: US 9,555,817 B2
(45) Date of Patent: Jan. 31, 2017

(54) END MEMBERS FOR RAIL SPRING ASSEMBLIES AND SUSPENSION SYSTEMS INCLUDING SAME

(71) Applicant: Firestone Industrial Products Company, LLC, Indianapolis, IN (US)

(72) Inventor: David D. Jackson, Jr., Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 36 days.

(21) Appl. No.: 14/413,917

(22) PCT Filed: Jul. 9, 2013

(86) PCT No.: PCT/US2013/049630
§ 371 (c)(1),
(2) Date: Jan. 9, 2015

(87) PCT Pub. No.: WO2014/011575
PCT Pub. Date: Jan. 16, 2014

(65) Prior Publication Data
US 2015/0122145 A1 May 7, 2015

Related U.S. Application Data

(60) Provisional application No. 61/669,644, filed on Jul. 9, 2012.

(51) Int. Cl.
*F16F 13/00* (2006.01)
*B61F 5/10* (2006.01)
(Continued)

(52) U.S. Cl.
CPC . *B61F 5/10* (2013.01); *B61F 5/02* (2013.01); *B61F 5/144* (2013.01); *B61F 5/22* (2013.01);
(Continued)

(58) Field of Classification Search
CPC ............... B61F 5/01; B61F 5/02; B61F 5/144; B61F 5/22; F16F 9/04; F16F 9/052; F16F 13/002
See application file for complete search history.

(56) References Cited

U.S. PATENT DOCUMENTS 3,200,771 A * 8/1965 Dobson .................... B61C 9/50
105/133
2009/0065989 A1* 3/2009 Leonard ................. B60G 11/27
267/64.27
(Continued)

FOREIGN PATENT DOCUMENTS

EP 2165911 3/2010
FR 2827550 1/2003
(Continued)

OTHER PUBLICATIONS

International Search Report and Written Opinion for corresponding patent application No. PCT/US2013/049630 dated Sep. 24, 2013.
(Continued)

*Primary Examiner* — Vishal Sahni
(74) *Attorney, Agent, or Firm* — Thomas R. Kingsbury; Fay Sharpe LLP

(57) ABSTRACT

End members (202, 204) dimensioned for securement to an associated flexible wall (206) of a rail spring assembly (200) can include an end member body formed from a polymeric material and can have a longitudinal axis (AX). The end member body can include an end wall (232) that extends transverse to the longitudinal axis. An outer side wall (234) can extend longitudinally from along the end wall. An outer peripheral wall (264) can extend from along the outer side wall and can be dimensioned to abuttingly engage the associated flexible wall. A plurality of support walls (272) can extend between and operatively interconnect the outer side wall and the outer peripheral wall and thereby buttress
(Continued)

at least the outer peripheral wall against loads applied by the associated flexible wall. Gas spring assemblies including one or more of such end members and suspension systems for rail vehicles including one or more of such gas spring assemblies are also included.

20 Claims, 17 Drawing Sheets

(51) Int. Cl.
  *B61F 5/02* (2006.01)
  *B61F 5/14* (2006.01)
  *B61F 5/22* (2006.01)
  *F16F 9/04* (2006.01)
  *F16F 9/05* (2006.01)
(52) U.S. Cl.
  CPC ............... *F16F 9/04* (2013.01); *F16F 9/052* (2013.01); *F16F 13/002* (2013.01)

(56) References Cited

U.S. PATENT DOCUMENTS

| | | | |
|---|---|---|---|
| 2009/0278289 A1* | 11/2009 | Gawinski | B60G 13/10 |
| | | | 267/64.27 |
| 2010/0127438 A1* | 5/2010 | Eise | F16F 9/057 |
| | | | 267/124 |

FOREIGN PATENT DOCUMENTS

| | | | |
|---|---|---|---|
| JP | 2000088030 | | 3/2000 |
| JP | 2009127682 | | 6/2009 |
| WO | WO2008025517 | * | 3/2008 |

OTHER PUBLICATIONS

Chinese Office Action issued in the corresponding Chinese Patent Application No. 201380036577.1 dated Mar. 25, 2016.

* cited by examiner

END MEMBERS FOR RAIL SPRING ASSEMBLIES AND SUSPENSION SYSTEMS INCLUDING SAME

This application is the National Stage of International Application No. PCT/US2013/049630, filed on Jul. 9, 2013, which claims the benefit of priority from U.S. Provisional Patent Application No. 61/669,644 filed on Jul. 9, 2012, the subject matter of which is hereby incorporated herein by reference in its entirety.

BACKGROUND

The subject matter of the present disclosure broadly relates to the art of spring devices and, more particularly, to end members dimensioned for use in forming rail spring assemblies that include a flexible wall and at least one pressurized gas chamber. Gas spring assemblies dimensioned for use in suspension systems of rail vehicles, and suspension systems for rail vehicles that include one or more of such gas spring assemblies are also included.

The subject matter of the present disclosure is capable of broad application and use in connection with a variety of applications and/or environments. However, the subject matter finds particular application and use in conjunction with rail vehicles, and will be described herein with particular reference thereto. However, it is to be appreciated that the subject matter of the present disclosure is amenable to use in connection with other applications and environments.

A suspension system, such as may be used in connection with motorized rail vehicles and/or rolling-stock rail vehicles, for example, can include one or more spring elements for accommodating forces and loads associated with the operation and use of the corresponding device (e.g., a rail vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Additionally, end members of conventional rail spring assemblies are often constructed to withstand forces and loads acting on the rail spring assembly that are transmitted to, from and/or between the opposing structural members of an associated rail vehicle. Conventional rail spring end members are often constructed of metal materials and are designed to withstand conditions (e.g., exposure to outdoor weather conditions) associated with use in operation during over-the-rail travel and/or under similar environments, such as impacts from foreign objects and/or the collection of dirt and debris. In some cases, however, it may be desirable to reduce the overall weight of a suspension system. Reducing the weight of the end members of the one or more rail spring assemblies could be one contributing factor to achieving such a goal.

Notwithstanding the widespread usage and overall success of the wide variety of end member designs that are known in the art, it is believed that a need exists to meet these competing goals while still retaining comparable or improved performance, ease of manufacture, ease of assembly, ease of installation and/or reduced cost of manufacture, without adversely affecting the strength, rigidity, robustness and/or overall integrity of the rail spring assembly.

BRIEF SUMMARY

One example of an end member in accordance with the subject matter of the present disclosure that is dimensioned for securement to an associated flexible wall of a rail spring assembly can include an end member body formed from a polymeric material and having a longitudinal axis extending between first and second body ends. The end member body can include an end wall disposed along the first body end and extending transverse to the longitudinal axis. An outer side wall can extend longitudinally from along the end wall toward the second body end. An outer peripheral wall can extend radially outward from along the outer side wall and can be dimensioned to abuttingly engage the associated flexible wall. A plurality of support walls can extend between and operatively interconnect the outer side wall and the outer peripheral wall and thereby buttress at least the outer peripheral wall against loads applied by the associated flexible wall.

One example of a rail spring assembly in accordance with the subject matter of the present disclosure that is dimensioned for use in a suspension system of a rail vehicle can include a flexible wall having a longitudinal axis and extending peripherally about the longitudinal axis between opposing ends to at least partially define a spring chamber. An end member secured across one of the ends of the flexible wall, and an end member according to the foregoing paragraph secured across the other one of the ends of the flexible wall.

One example of a suspension system of a rail vehicle in accordance with the subject matter of the present disclosure can include a pressurized gas system and at least one rail spring assembly according to the foregoing paragraph. The at least one rail spring assembly can be operatively connected with the pressurized gas system such that the spring chamber of the at least one rail spring assembly can be selectively placed in fluid communication with the pressurized gas system.

DETAILED DESCRIPTION

Figure 1:
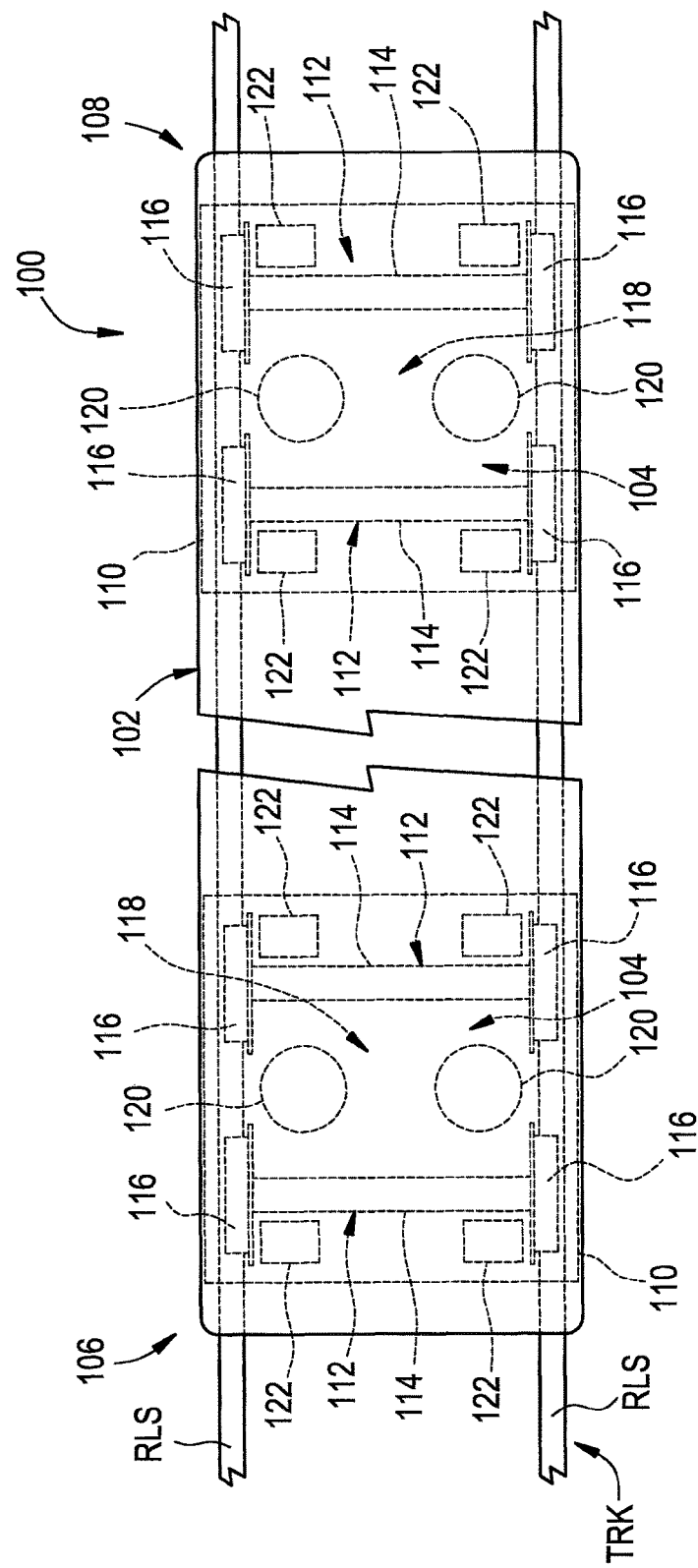
FIG. 1 is a schematic representation of one example of a rail vehicle including a suspension system in accordance with the subject matter of the present disclosure.

Turning now to the drawings, wherein the showings are for the purpose of illustrating examples of the subject matter of the present disclosure and not for the purpose of limiting the same, FIG. 1 illustrates one example of a vehicle including a suspension system in accordance with the subject matter of the present disclosure, such as a rail vehicle 100 that is adapted for movement or is otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one rail spring assembly. In the exemplary arrangement shown in FIGS. 1 and 2, bogies 104 include two rail spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
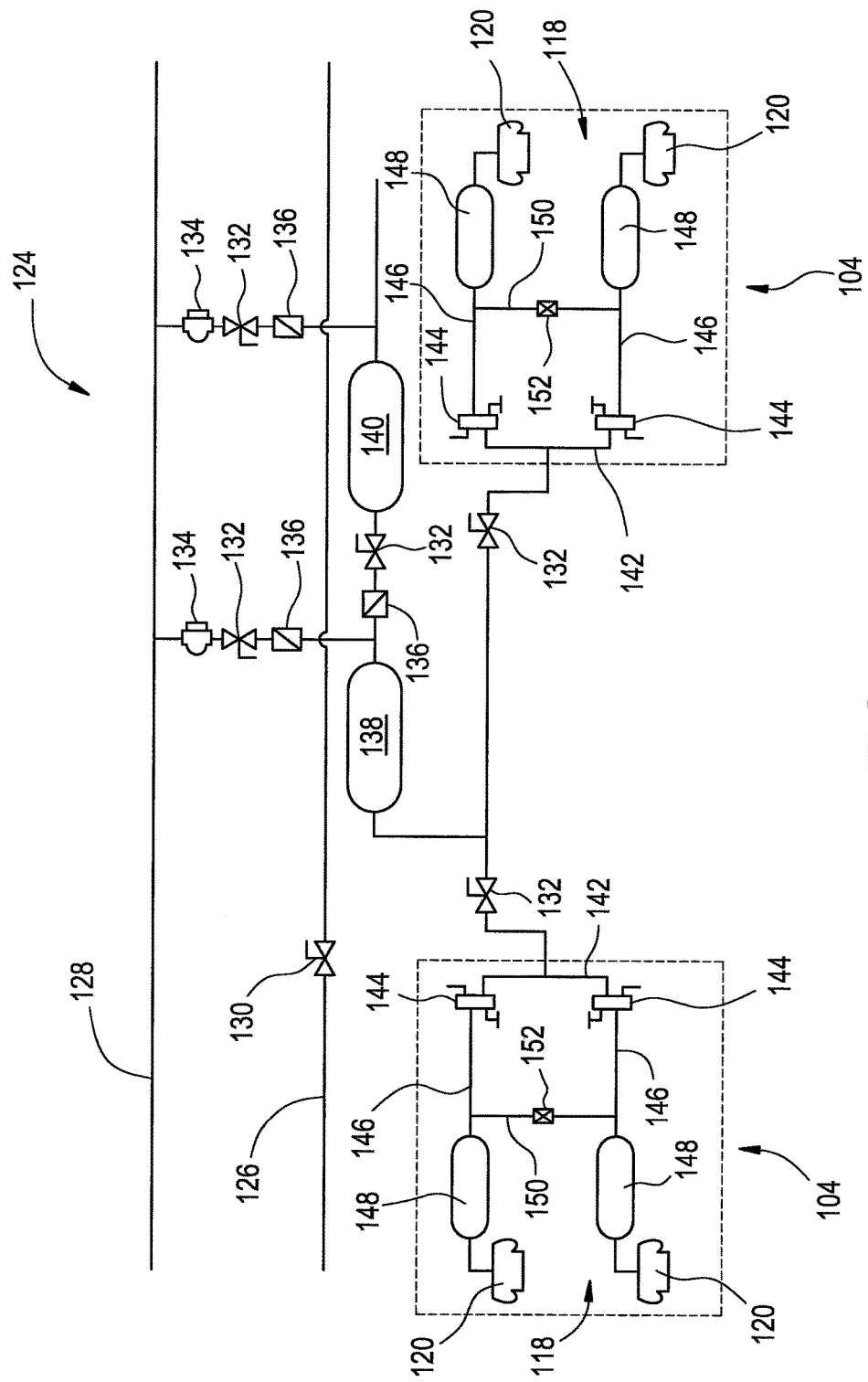
FIG. 2 is a schematic representation of one example of a pneumatic gas system operatively associated with the suspension system in FIG. 1.
Figure 3:
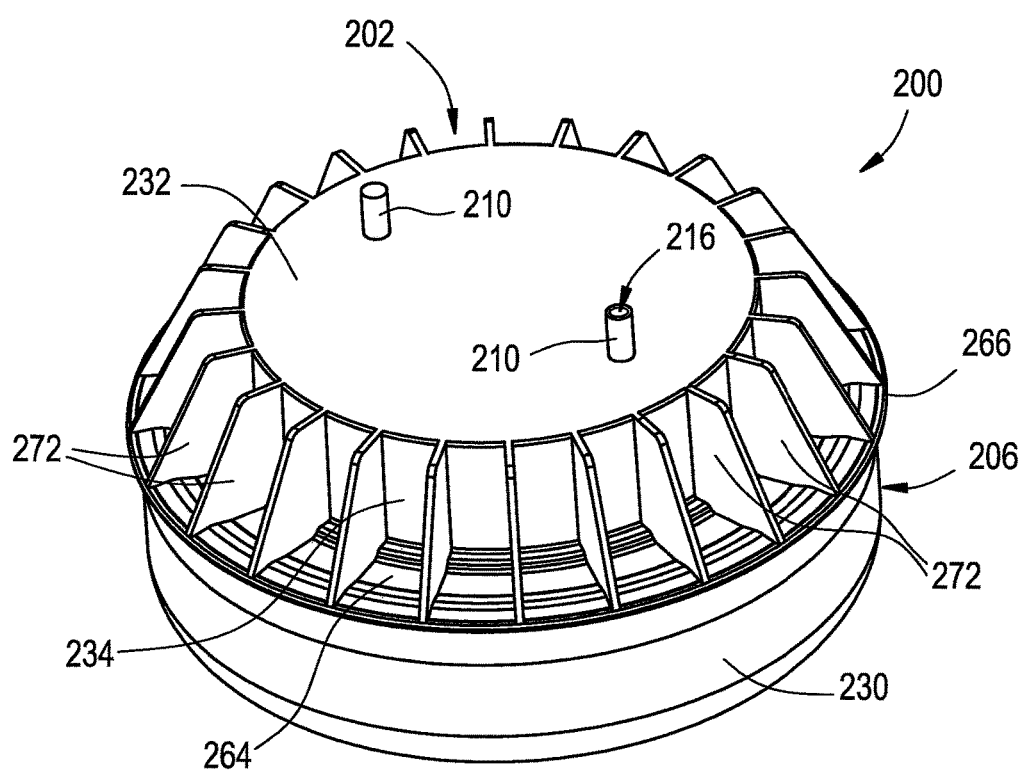
FIG. 3 is a top perspective view of one example of a rail spring assembly in accordance with the subject matter of the present disclosure.
Figure 4:
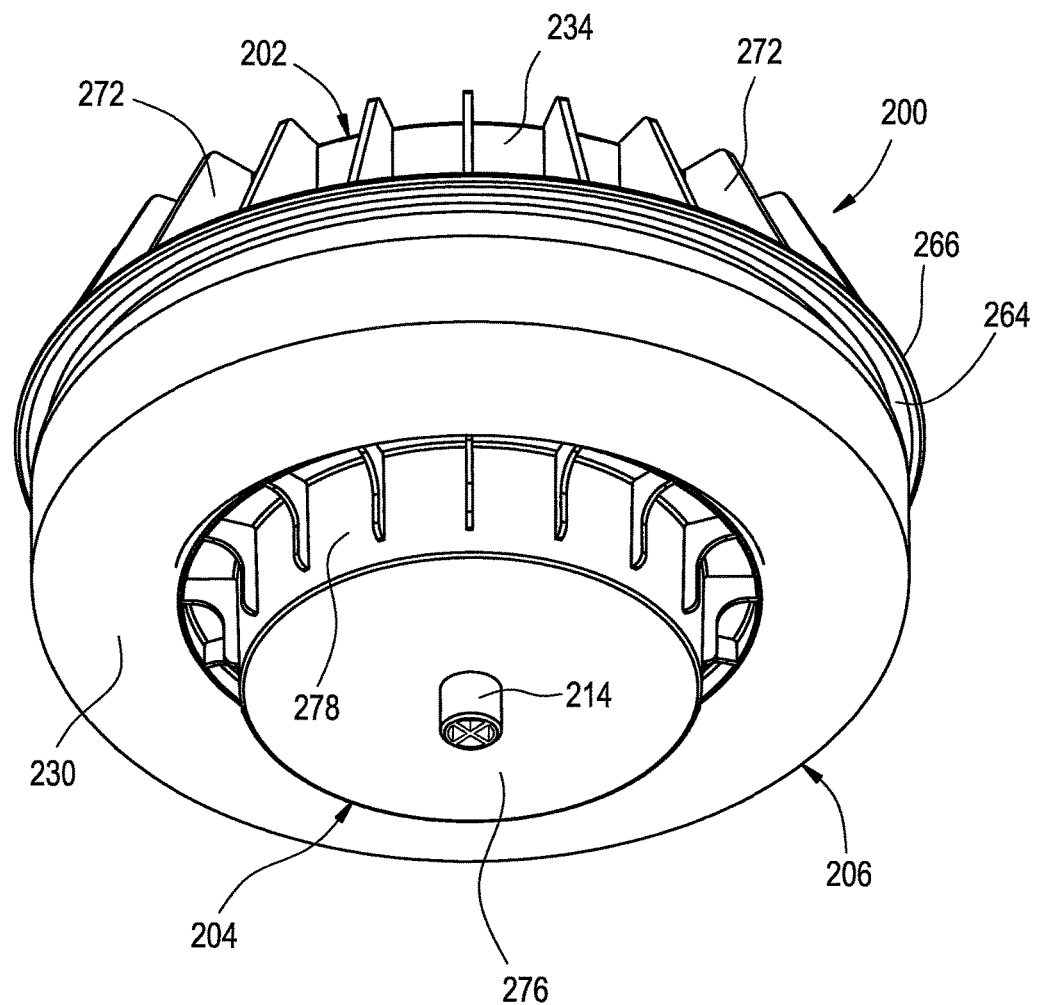
FIG. 4 is a bottom perspective view of the exemplary rail spring assembly in FIG. 3.
Figure 5:
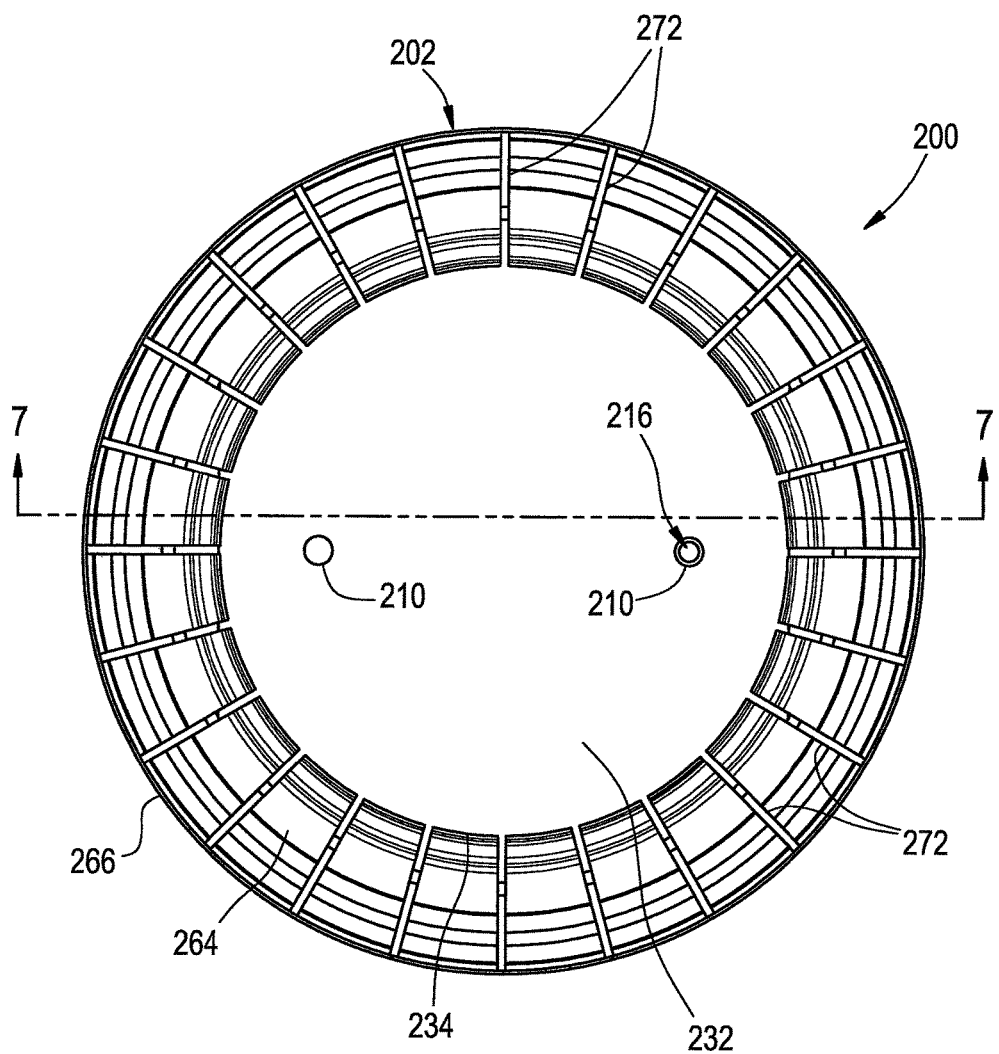
FIG. 5 is a top plan view of the exemplary rail spring assembly in FIGS. 3 and 4.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least rail spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying rail spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with rail spring assemblies 120, such as by way of gas lines 146, and are selectively operable to transfer pressurized gas into and out of the rail spring assemblies. In some cases, a pressurized gas storage device or reservoir 148 can, optionally, be fluidically connected along gas line 146 between leveling valve 144 and rail spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

Figure 6:
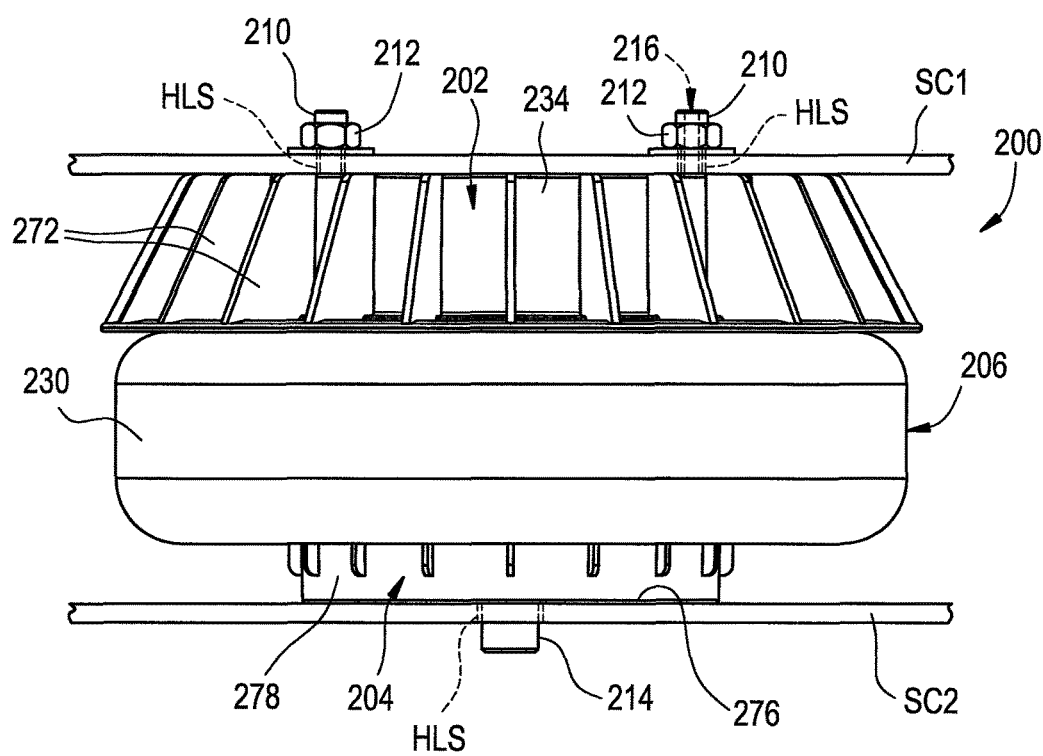
FIG. 6 is a side elevation view of the exemplary rail spring assembly in FIGS. 3-5.
Figure 7:
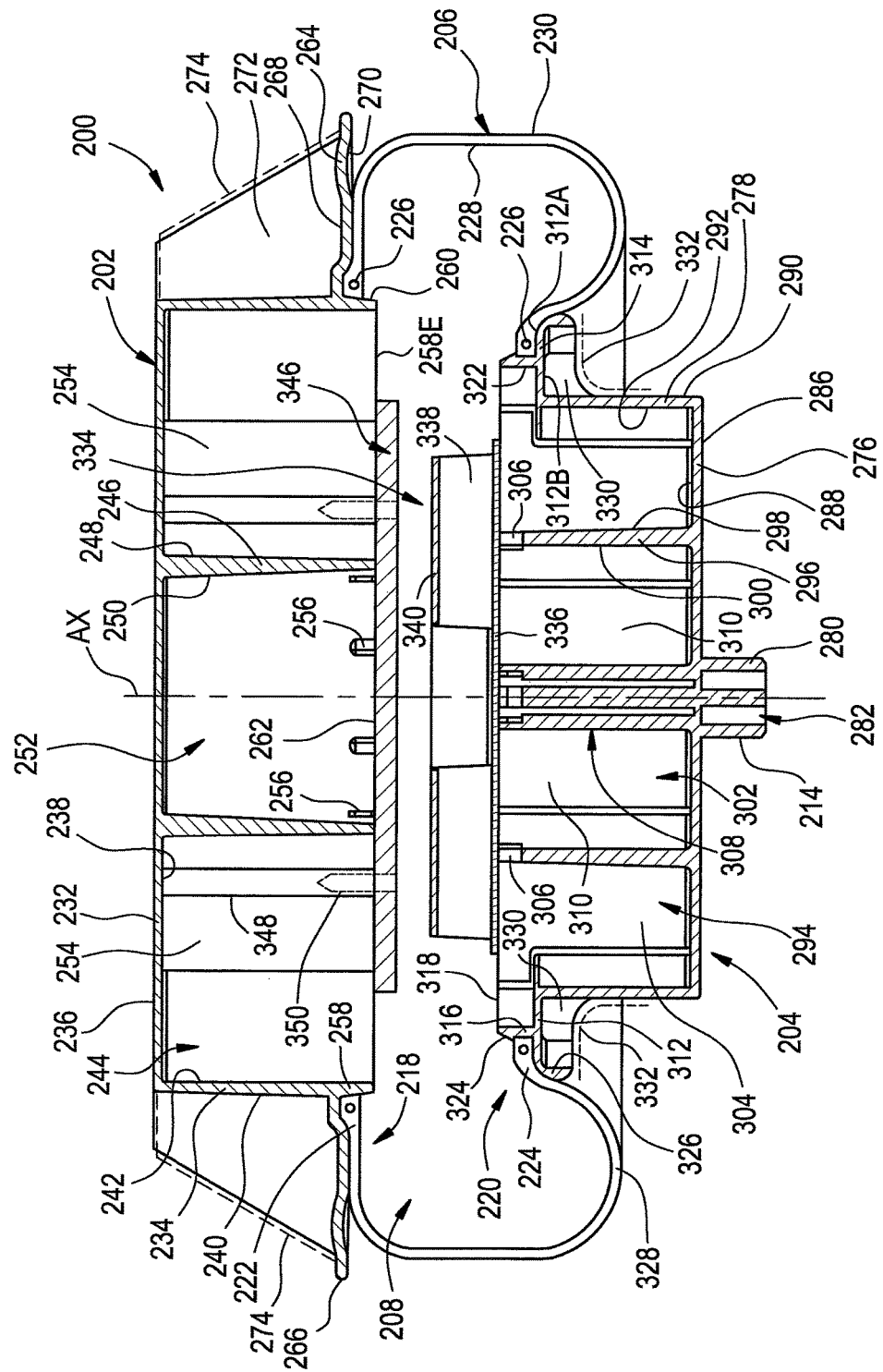
FIG. 7 is a cross-sectional side view of the exemplary rail spring assembly in FIGS. 3-6 taken from along line 7-7 in FIG. 5.
Figure 8:
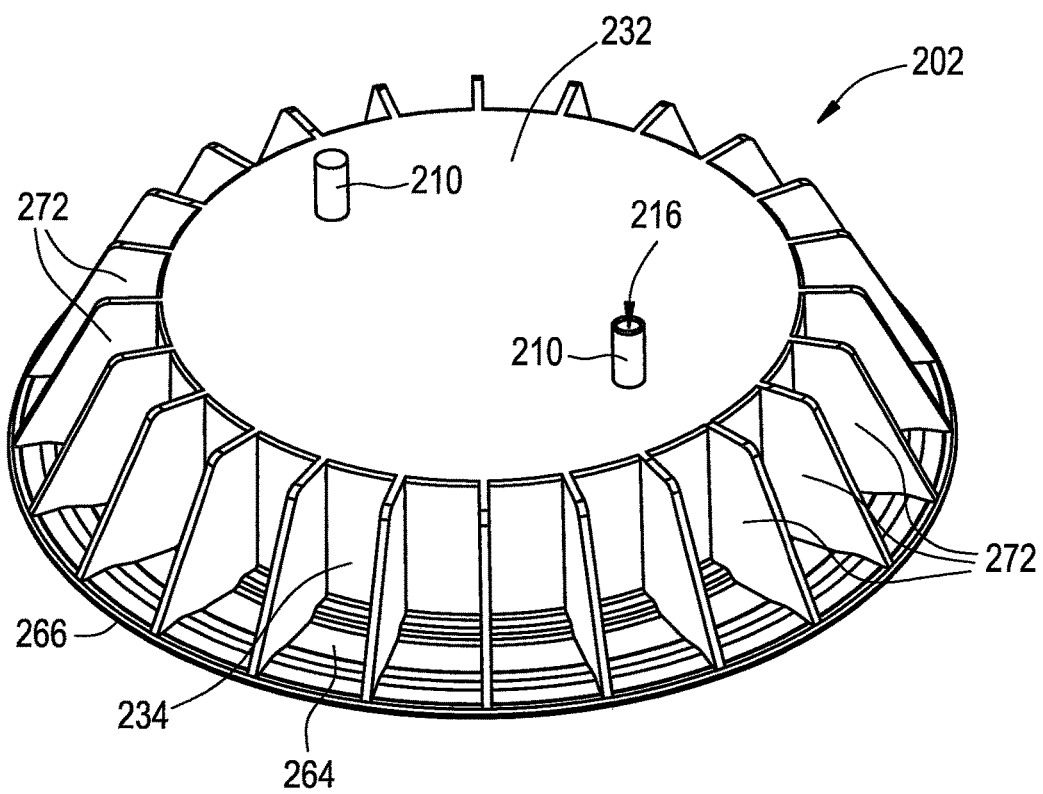
FIG. 8 is a top perspective view of one example of an end member in accordance with the subject matter of the present disclosure.
Figure 9:
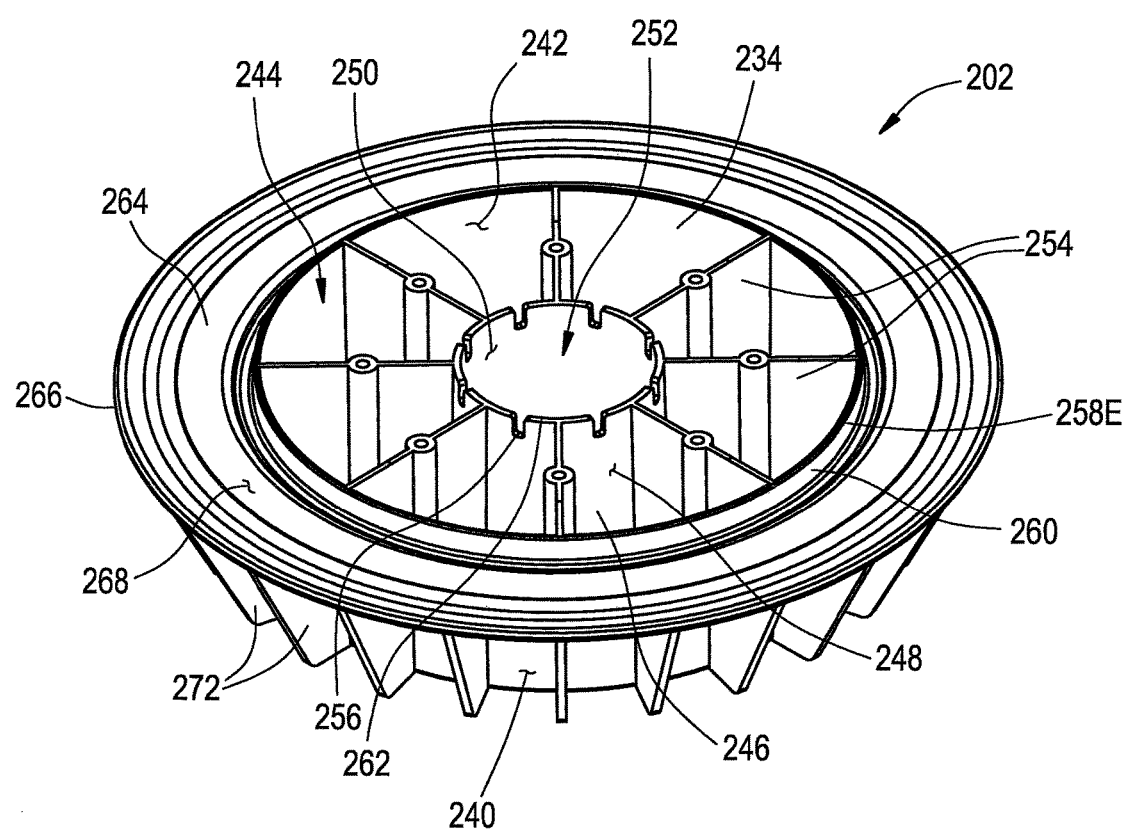
FIG. 9 is a bottom perspective view of the exemplary end member in FIG. 8.
Figure 10:
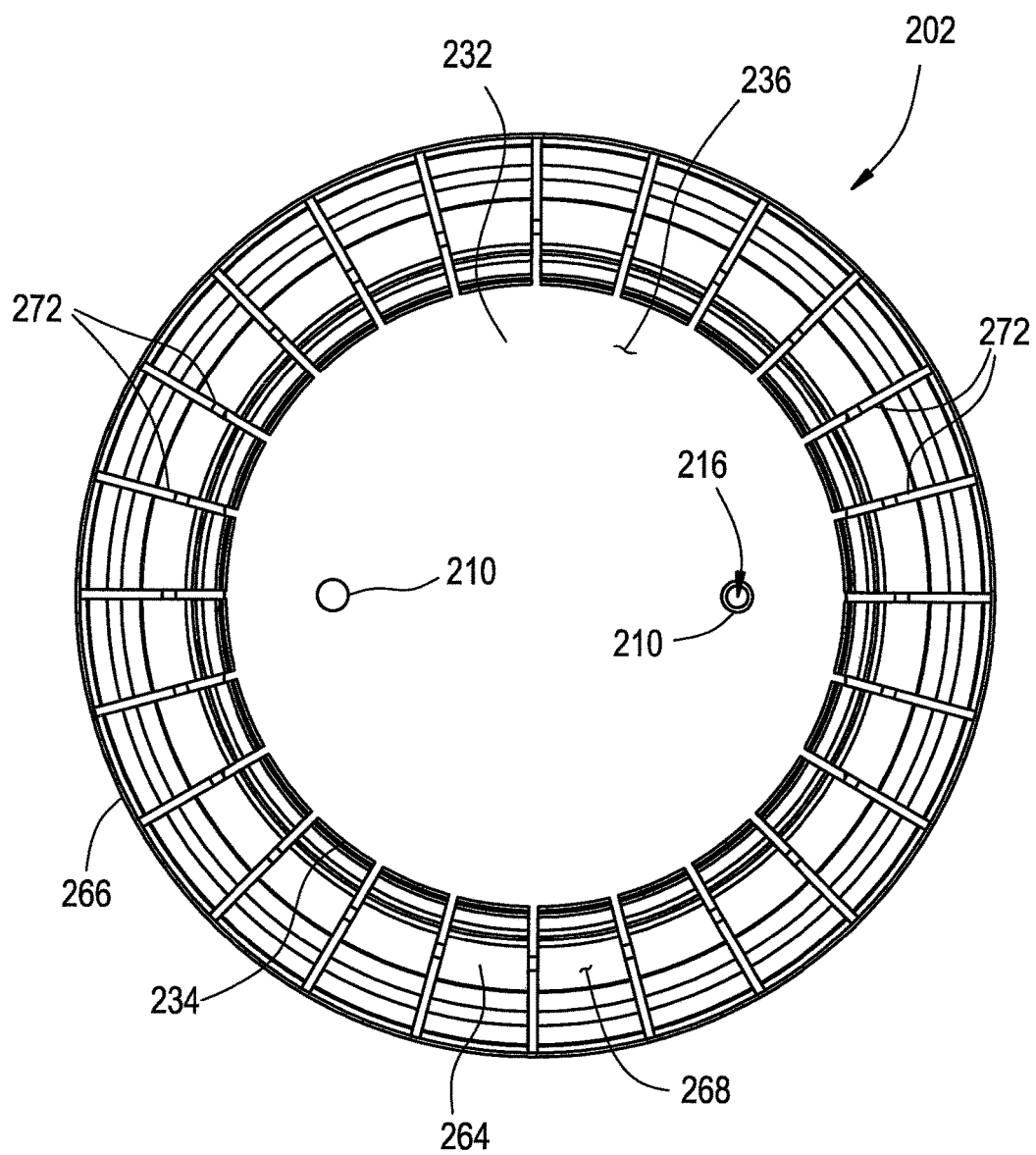
FIG. 10 is a top plan view of the exemplary end member in FIGS. 8 and 9.
Figure 11:
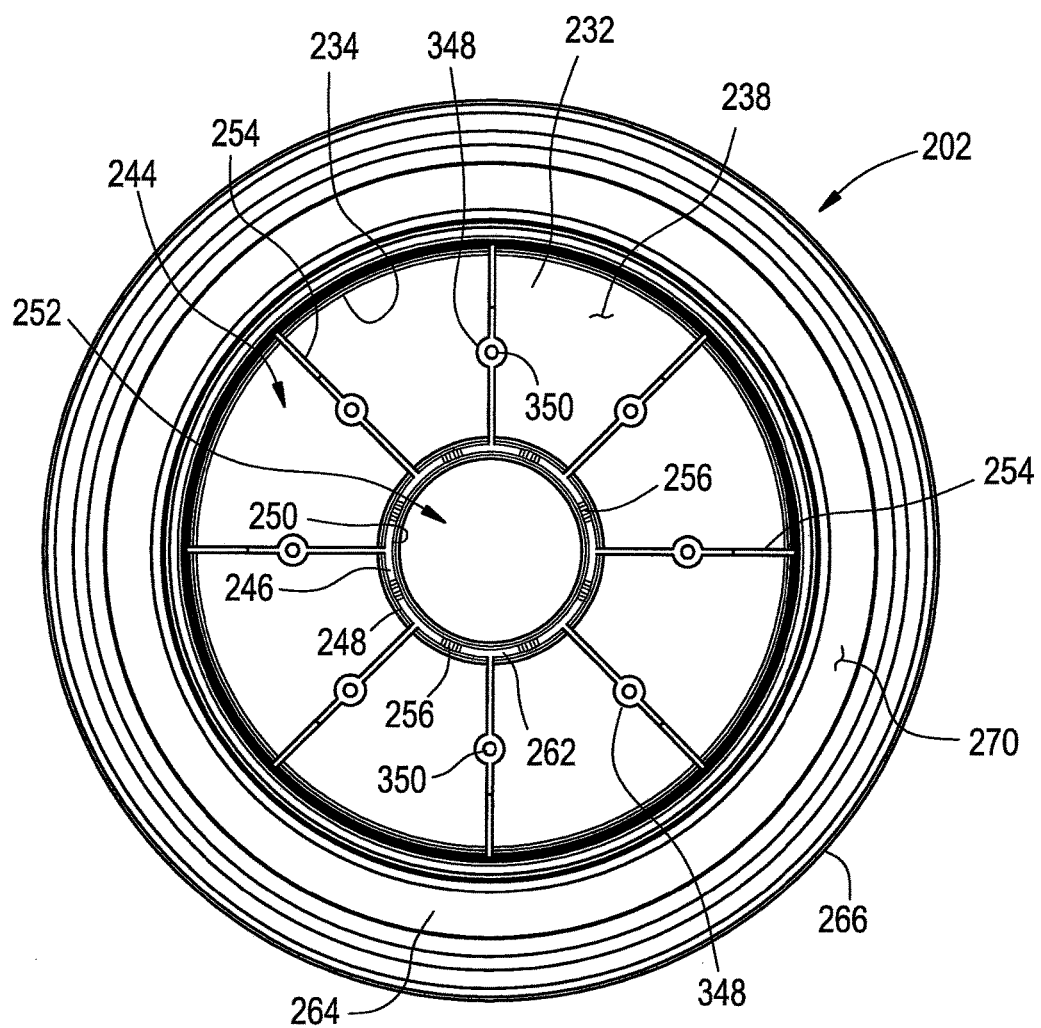
FIG. 11 is a bottom plan view of the exemplary end member in FIGS. 8-10.
Figure 12:
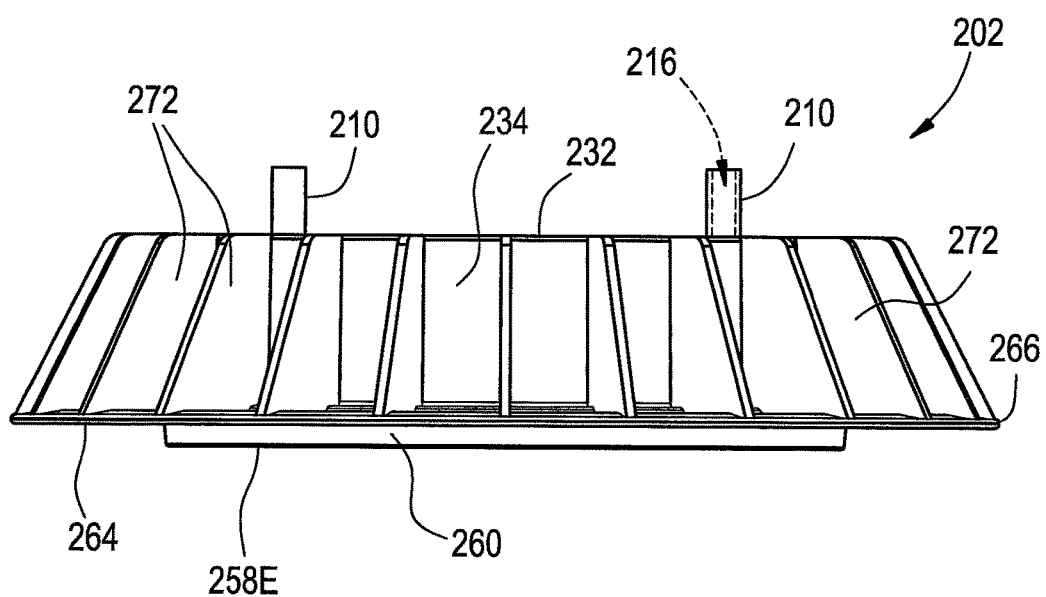
FIG. 12 is a side elevation view of the exemplary end member in FIGS. 8-11.
Figure 13:
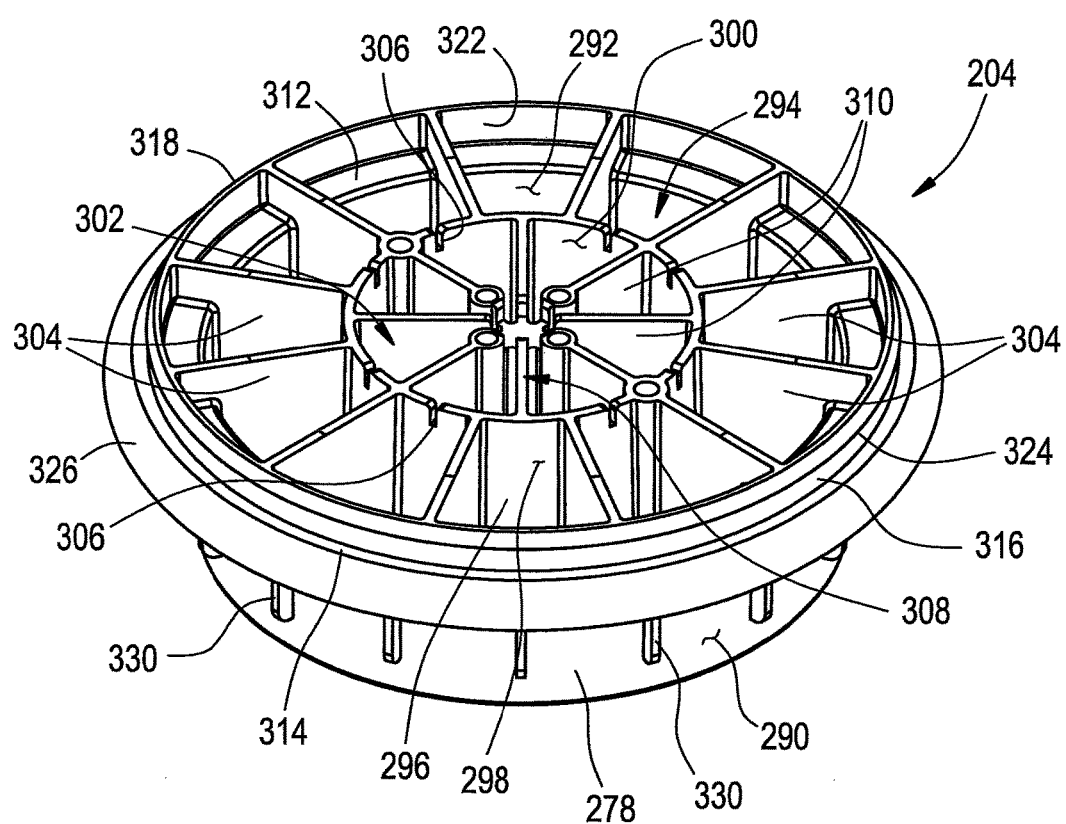
FIG. 13 is a top perspective view of another example of an end member in accordance with the subject matter of the present disclosure.
Figure 14:
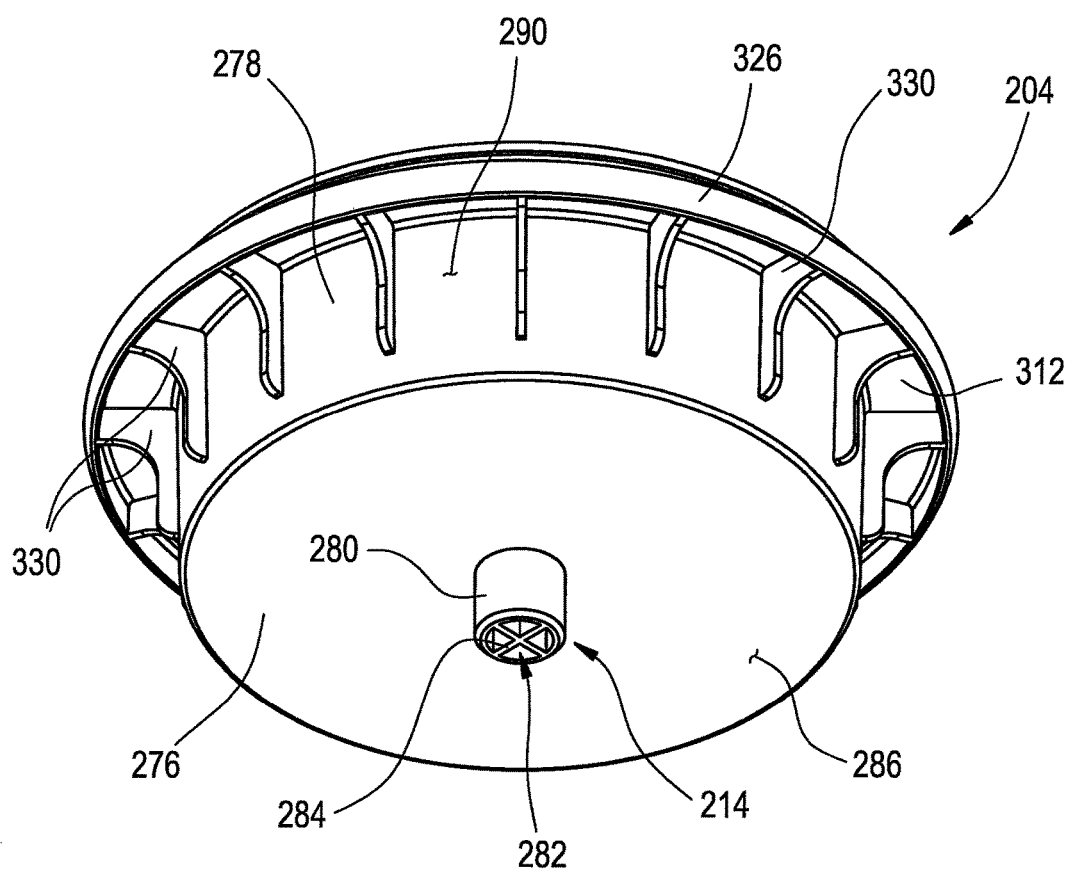
FIG. 14 is a bottom perspective view of the exemplary end member in FIG. 13.
Figure 15:
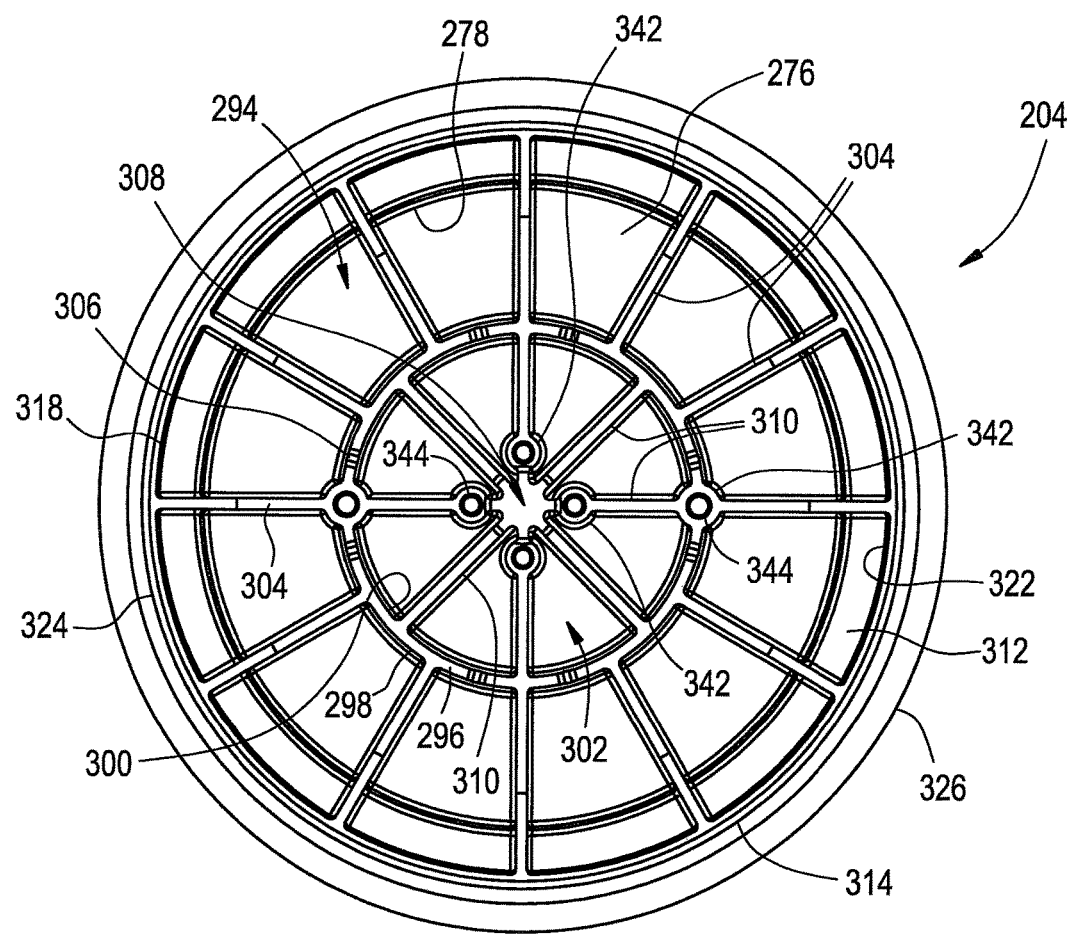
FIG. 15 is a top plan view of the exemplary end member in FIGS. 13 and 14.
Figure 16:
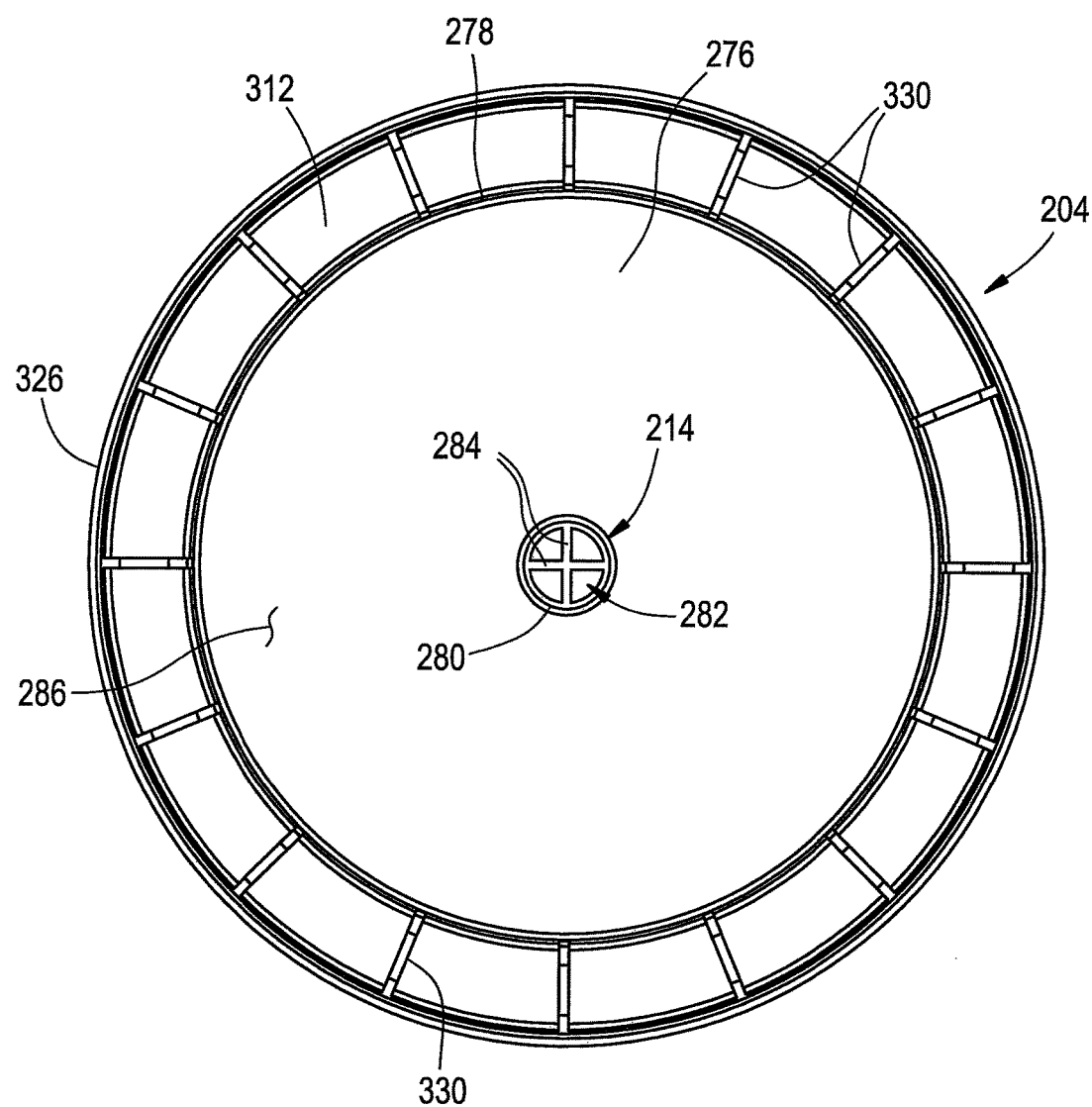
FIG. 16 is a bottom plan view of the exemplary end member in FIGS. 13-15.
Figure 17:
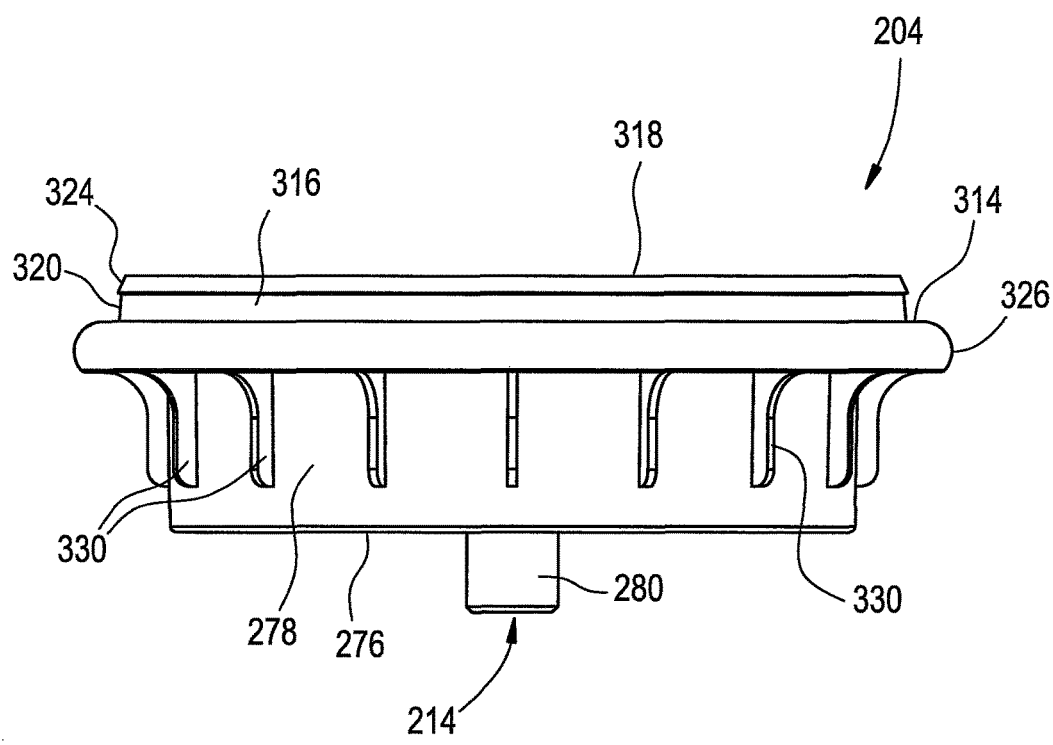
FIG. 17 is a side elevation view of the exemplary end member in FIGS. 13-16.

One example of a rail spring assembly in accordance with the subject matter of the present disclosure, such as may be suitable for use as one or more of rail spring assemblies 120 in FIGS. 1 and 2, for example, is shown as rail spring assembly 200 in FIGS. 3-7. The rail spring assembly has a longitudinal axis AX (FIG. 7) and includes an end member 202, an end member 204 spaced longitudinally from end member 202 and a flexible wall 206 that extends peripherally about the longitudinal axis and is secured between the end members to at least partially define a spring chamber 208 (FIG. 7).

Rail spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. As illustrated in FIG. 6, for example, end member 202 can be secured on or along a structural component SC1, such as an associated vehicle body 102 in FIG. 1, for example. It will be appreciated that end member 202 can be secured on or along the structural component in any suitable manner. As one example, end member 202 can, optionally, include one or more securement devices 210, such as threaded mounting studs, for example, that project outwardly from the end member. In the arrangement shown, in FIG. 6, securement devices 210 extend through corresponding holes HLS in structural component SC1 and receive securement devices 212, such as threaded nuts, for example. It will be appreciated, however, that other configurations and/or arrangements could alternately be used.

Additionally, it will be appreciated that end member 204 can be secured on or along an associated structural component in any suitable manner. For example, end member 204 is shown as being secured on or along a structural component SC2, such as an associated rail bogie 104 in FIG. 1, for example. In the arrangement shown in FIG. 6, end member 204 includes a securement feature 214 that projects outwardly from along the end member and extends through a corresponding hole HLS in structural component SC2. A suitable securement device (not shown) can, optionally, engage securement feature 214 to retain the end member in abutting engagement with the structural component.

A pneumatic system of an associated vehicle, such as pneumatic system 124, for example, can be in fluid communication with spring chamber 208 of rail spring assembly 200 in any suitable manner and by way of any suitable fluid communication passages, ports and/or connections. As one example, one or more of securement devices 210 can include a gas transfer passage 216 extending therethrough in fluid communication with spring chamber 208. In such case, gas transfer passage 216 can be fluidically connected with the pneumatic system of the associated vehicle such that pressurized gas can be selectively transferred into and/or out of spring chamber 208, such as to selectively control or adjust the height of rail spring assembly 200, for example.

With further reference to FIGS. 3-7, flexible wall 206 can be of any suitable type, kind, construction and/or configuration. As one example, flexible wall 206 can extend longitudinally between opposing ends 218 and 220, and can include mounting beads 222 and 224 that are respectively disposed along ends 218 and 220 of flexible wall 206. In a preferred arrangement, mounting beads 222 and 224 are constructed and dimensioned to form a substantially fluid-tight seal with an associated end member, such as a respective one of end members 202 and 204, for example. In some cases, a substantially-inextensible reinforcing element 226 can be at least partially embedded within either or both of mounting beads 222 and 224, such as is shown in FIG. 7, for example.

As identified in FIG. 7, flexible wall 206 can have an inner surface 228 that can at least partially define spring chamber 208 and an outer surface 230. Flexible wall 206 can include or can otherwise be at least partially formed from one or more filament-reinforced, elastomeric plies or layers (not shown) and/or one or more un-reinforced, elastomeric plies or layers (not shown), for example. Typically, one or more filament-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used. In some cases, the one or more filament-reinforced, elastomeric plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Additionally, one or more filament-reinforced, elastomeric plies can be oriented relative to one another in any suitable manner, such as, for example, by having the filaments of one ply disposed at one bias angle and the filaments of another ply disposed at a similar bias angle but extending in the opposing direction.

End member 202 is shown in an assembled condition in FIGS. 3-7 and in additional detail in FIGS. 8-12, and includes an end wall 232 and an outer side wall 234 that extends axially from along end wall 232. The end wall has an outer surface 236 and an inner surface 238, and the outer side wall has an outer surface 240 and an inner surface 242. Surfaces 236 and 240 at least partially form the exterior of end member 202, and surfaces 238 and 242 at least partially define a chamber or reservoir 244 within end member 202.

End member 202 can also, optionally, include an inner side wall 246 that extends axially from along end wall 232. In some cases, inner side wall 246 can extend in approximate alignment with outer side wall 234, such as is shown in FIG. 7, for example. In other cases, the inner side wall and the outer side wall extend from along the end wall at an angle relative to one another. Inner side wall 246 includes an outer surface 248 that can, in some cases, further define reservoir 244, and an inner surface 250 that can at least partially define a chamber or reservoir 252. In some cases, one or more passages can extend between reservoirs 244 and 252 such that the reservoirs can be in fluid communication with one another.

In some cases, end member 202 can, optionally, include one or more support walls that extend between or otherwise operatively interconnect the inner and outer side walls. In the arrangement shown in FIGS. 7-12, end member 202 includes a plurality of support walls 254 that extend in a generally radial direction and operatively interconnect outer side wall 234 and inner side wall 246. Support walls 254 are disposed in spaced relation to one another and separate reservoir 244 into a plurality of chamber portions (not numbered). In some cases, support walls 254 can extend along the full axial length of the inner and/or outer side walls. In which case, a plurality of passages 256 can be formed through inner side wall 246 to permit fluid communication between inner reservoir 252 and the chamber portions of reservoir 244.

End member 202 is also shown as including a mounting portion 258 of outer side wall 234 that includes a distal end 258E and an outer surface portion 260. In some cases, distal end 258E can be disposed in approximate alignment with a distal end 262 of inner side wall 246. Outer surface portion 260 at least partially defines a mounting seat (not numbered) for receivingly engaging mounting bead 222 of flexible wall 206. In the arrangement shown in FIG. 7, mounting bead 222 is compressively fitted along outer surface portion 260 of mounting portion 258 such that a substantially fluid-tight seal is formed therebetween. It will be appreciated, however, that other configurations and/or arrangements could alternately be used.

End member 202 is further shown as including an outer peripheral wall 264 that extends radially outwardly in a direction generally transverse to axis AX from along outer side wall 234 toward an outer peripheral edge 266 that can at least partially define and outermost periphery of end member 202. Outer peripheral wall 264 includes opposing surfaces 268 and 270 with surface 268 facing toward end wall 232 and surface 270 at least partially disposed in abutting engagement with outer surface 230 of flexible wall 206. In some cases, outer peripheral wall 264 may be referred to in the art as a bead skirt, and can have a cross-sectional profile or shape that is suitable for improving stability and/or control of the flexible wall during lateral (i.e., transverse) movement of the end members of the rail spring assembly relative to one another.

End member 202 also includes one or more support walls that extend between or otherwise operatively interconnect outer side wall 234 and outer peripheral wall 264. In the arrangement shown in FIGS. 3-12, end member 202 includes a plurality of gusset or support walls 272 that project radially outwardly from along outer side wall 234 and interconnect with outer peripheral wall 264. As such, support walls 272 can, in some cases, function as a gusset or reinforcement wall to buttress or otherwise provide at least axial support to outer peripheral wall 264, such as may be useful to minimize or at least reduce axial deflection of the outer peripheral wall under forces and/or loads generated or otherwise applied to the outer peripheral wall by flexible wall 206. In a preferred arrangement, support walls 272 can extend along one surface (e.g., surface 268) of outer peripheral wall 264 with flexible wall 206 disposed in abutting engagement along the opposing surface (e.g., surface 270).

Additionally, in some cases, an outer cover, which is represented by dashed line 274 (FIG. 7), can be disposed on or along at least a portion of support walls 272. If provided, a cover, such as cover 274, may be useful to minimize impacts from foreign objects and/or the collection of dirt and debris, for example.

End member 204 is shown in an assembled condition in FIGS. 3-7 and in additional detail in FIGS. 13-17, and includes an end wall 276 and an outer side wall 278 that extends axially from along and wall 276. Securement feature 214 projects axially from along end wall 276 in a direction opposite outer side wall 278, and includes a securement wall 280 that at least partially defines a passage 282 extending axially-inwardly into the securement feature. Optionally, one or more support walls 284 can extend at least partially across passage 282, such as may be useful for strengthening securement wall 280, for example.

End wall 276 has an outer surface 286 and an inner surface 288, and outer side wall 278 has an outer surface 290 and an inner surface 292. Surfaces 286 and 290 at least partially formed the exterior of end member 204, and surfaces 288 and 292 at least partially define a chamber or reservoir 294 within end member 204. End member 204 can also, optionally, include an inner side wall 296 that extends axially from along end wall 276. In some cases, inner side wall 296 can extend in approximate alignment with outer side wall 278, such as is shown in FIG. 7. Inner side wall 296 includes an outer surface 298 that can, in some cases, further defined reservoir 294, and an inner surface 300 that can at least partially define a chamber or reservoir 302. In some cases, one or more passages can extend between reservoirs 294 and 302 such that the reservoirs can be in fluid communication with one another.

In some cases, end member 204 can, optionally, include one or more support walls that extend between or otherwise operatively interconnect the inner and outer side walls. In the arrangement shown in FIGS. 7 and 13-17, end member 204 includes a plurality of support walls 304 that extend in a generally radial direction and operatively interconnect outer side wall 278 and inner side wall 296. Support walls 304 are disposed in spaced relation to one another and separate reservoir 294 into a plurality of chamber portions (not numbered). In some cases, support walls 304 can extend along the full axial length of the inner and/or outer side walls. In which case, a plurality of passages 306 can be formed through inner side wall 246 to permit fluid communication between inner reservoir 302 and the chamber portions of reservoir 294.

In some cases, end member 204 can, optionally, include a support column 308 (FIGS. 7 and 15) or other structure that extends axially from along end wall 276, such as may be useful for supporting axially-applied loads due to contact with end member 202 or a jounce bumper or other component supported thereon. In some cases, end member 204 can, optionally, include one or more support walls that extend between or otherwise operatively interconnect the inner side wall and the support column or other structure, if provided. In the arrangement shown in FIGS. 7 and 13-17, for example, end member 204 includes a plurality of support walls 310 that extend in a generally radial direction and operatively interconnect inner side wall 296 and support column 308. Support walls 310 are disposed in spaced relation to one another and separate inner reservoir 302 into a plurality of chamber portions (not numbered).

End member 204 also includes an outer peripheral wall 312 that extends radially outwardly in a direction generally transverse to axis AX from along outer side wall 278 toward an outer peripheral edge 314 that can, in some cases, at least partially define an outermost periphery of end member 204. Outer peripheral wall 312 can include opposing surfaces 312A and 312B with surface 312A dimensioned for abutting engagement with flexible wall 206 and surface 312B disposed opposite surface 312A. A mounting wall 316 extends axially from along outer peripheral wall 312 toward the distal edge 318. Mounting wall 316 includes an outer surface 320 and an inner surface 322. Outer surface 320 can at least partially define a mounting seat (not numbered) for receivingly engaging mounting bead 224 of flexible wall 206. In the arrangement shown in FIG. 7, mounting bead 224 is compressively fitted along outer surface 320 of mounting wall 316 such that a substantially fluid-tight seal is formed therebetween. It will be appreciated, however, that other configurations and/or arrangements could alternately be used. For example, an annular projection 324 can extend radially outwardly from along outer surface 320 and can be used to at least partially engage and retain mounting bead 224 on or along mounting wall 316. In some cases, an outer support wall 326 (FIG. 7) can extend axially from along outer peripheral wall 312 in a direction toward end wall 276. It will be appreciated that outer support wall 326 can have any suitable cross-sectional shape, profile and/or configuration, such as being approximately linear or curvilinear (as shown in FIG. 7), for example.

In the configuration shown in FIGS. 3-7, flexible wall 206 extends radially outwardly beyond mounting wall 316 and outer peripheral wall 312, and extends along outer support wall 326 such that a rolling lobe 328 is formed along the flexible wall. Outer support wall 326 is shown as having a curved cross-sectional shape, and rolling lobe 328 is displaceable along the outer support wall as the rail spring assembly is axially displaced between extended and compressed conditions, such as may occur during dynamic use in operation. It will be appreciated that other shapes and/or configurations for outer support wall 326 can alternately be used, such as may be useful to provide desired performance characteristics, for example.

End member 204 also includes one or more support walls that extend between or otherwise operatively interconnect outer side wall 278, outer peripheral wall 312, and/or outer support wall 326. In the arrangement shown in FIGS. 3-7 and 13-17, end member 202 includes a plurality of gusset or support walls 330 that project radially outwardly from along outer side wall 278 and interconnect with outer peripheral wall 312 and/or outer support wall 326. As such, support walls 330 can, in some cases, function as a gusset or reinforcement wall to buttress or otherwise provide at least axial support to outer peripheral wall 312 and/or outer support wall 326, such as may be useful to minimize or at least reduce axial deflection of the outer peripheral wall and/or outer support wall under forces and/or loads generated or otherwise applied to the outer peripheral wall and/or outer support wall by flexible wall 206. In a preferred arrangement, support walls 330 can extend along one surface (e.g., surface 312B) of outer peripheral wall 312 with flexible wall 206 disposed in abutting engagement along the opposing surface (e.g., surface 312A).

In some cases, an outer cover, which is represented by dashed line 332 (FIG. 7), can be disposed on or along at least a portion of support walls 330. If provided, a cover, such as cover 332, may be useful to minimize impacts from foreign objects and/or the collection of dirt and debris, for example.

As is well known in the art, it is generally desirable to avoid or at least minimize contact between end members of a rail spring assembly, such as may occur due to variations in load conditions and/or upon deflation of the rail spring assembly, for example. As such, rail spring assembly 200 is shown in FIG. 7 as including a jounce bumper 334 disposed within spring chamber 208 and supported on end member 204. Jounce bumper 334 is shown as including a mounting plate 336 that is disposed in abutting engagement with end member 204, a bumper body 338 supported on the mounting plate, and a wear plate 340 that is at least partially embedded within bumper body 338.

It will be appreciated that jounce bumper 334 can be secured on or along an end member in any suitable manner. For example, end member 204 is shown as including bosses 342 that extend axially along one or more of inner side wall 296, support walls 304 and/or 310, and/or support column 308. As identified in FIG. 15, a securement feature 344, such as a threaded hole, for example, can be provided on or along bosses 342, such as may be suitable for receiving a threaded fastener (not shown) to secure the jounce bumper or a component thereof (e.g., mounting plate 336) on or along the end member.

Rail spring assembly 200 can also, optionally, include a complimentary component that may be dimensioned to or otherwise suitable for abuttingly engaging the jounce bumper or a component thereof (e.g., wear plate 340). In the arrangement shown in FIG. 7, rail spring 200 includes a bearing plate 346 the secured on or along end member 202. It will be appreciated that the bearing plate can be attached to the end member in any suitable manner. For example, end member 202 can include one or more bosses 348 that extend axially along one or more of support walls 254. As identified in FIG. 11, a securement feature 350, such as a threaded hole, for example, can be provided on or along bosses 348, such as may be suitable for receiving a threaded fastener (not shown) to secure the bearing plate on or along the end member.

It will be appreciated that an end member in accordance with the subject matter of the present disclosure can be formed or otherwise manufactured from any suitable material or combination of materials. In a preferred arrangement, however, end member 202 and/or 204 can be formed from a non-metallic material, such as a thermoplastic or thermoset material, for example. Examples of suitable non-metallic materials from which either or both of end members 202 and 204 can be formed include thermoplastic materials, such as glass or other fiber-reinforced polypropylene, glass or other fiber-reinforced polyamide, as well as high-strength (e.g., unfilled) polyester, polyethylene, polypropylene or other polyether-based materials, or any combination thereof.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member dimensioned for securement to an associated flexible wall to at least partially form an associated rail spring assembly, said end member comprising:
   an end member body formed from a polymeric material and having a longitudinal axis extending between first and second body ends, said end member body including:
      an end wall disposed along said first body end and extending transverse to said longitudinal axis, said end wall including an interior end surface and an exterior end surface facing away from said interior end surface;
      an outer side wall extending longitudinally from along said end wall toward said second body end, said outer side wall including an interior side surface and an exterior surface facing away from said interior side surface with said interior end surface and said interior side surface at least partially defining an end member chamber and with said exterior end surface and said exterior side surface at least partially forming an exterior of said end member body;
      an outer peripheral wall extending radially outward from along said outer side wall toward an annular outermost peripheral edge of said end member body, said outer peripheral wall dimensioned to abuttingly engage the associated flexible wall; and,
      a plurality of gusset walls disposed along said exterior of said end member body, said plurality of gusset walls extending between and operatively interconnecting said outer side wall and said outer peripheral wall and thereby buttressing at least said outer peripheral wall against loads applied by the associated flexible wall.

2. An end member according to claim 1, wherein said end member body includes an outer support wall disposed radially outward from said outer side wall and extending axially from along said outer peripheral wall and dimensioned to abuttingly engage the associated flexible wall with at least one of said outer peripheral wall and said outer support wall at least partially defining said annular outermost peripheral edge of said end member body.

3. An end member according to claim 1, wherein said outer peripheral wall includes a first side surface dimensioned to abuttingly engage the associated flexible wall and a second side surface opposite said first side surface, and said plurality of gusset walls extend radially outward from along said exterior side surface of said outer side wall and along said second side surface of said outer peripheral wall.

4. An end member according to claim 1, wherein said plurality of gusset walls are disposed in radially-spaced relation to one another about said longitudinal axis.

5. An end member according to claim 1, wherein said outer peripheral wall is disposed in axially-spaced relation to said end wall, and said plurality of gusset walls extend longitudinally along said exterior side surface of said outer side wall between said end wall and said outer peripheral wall.

6. An end member according to claim 1, wherein said end member body includes an inner side wall extending from said end wall and disposed radially inward from said outer side wall.

7. An end member according to claim 6, wherein said end member body includes a plurality of support walls extending between and interconnecting said outer side wall and said inner side wall.

8. An end member according to claim 6, wherein said inner side wall includes an inner surface that at least partially defines said end member chamber within said end member body, and said inner side wall includes one or more passages extending through said inner side wall such that pressurized gas can flow into and out of said end member chamber through said one or more passages.

9. An end member according to claim 1 further comprising a cover wall extending along and at least partially covering at least a portion of at least two of said plurality of gusset walls.

10. An end member according to claim 1, wherein said end member body includes one or more bosses disposed along one or more of said walls thereof.

11. An end member according to claim 10, wherein said one or more bosses terminate along a distal edge of said one or more walls, and said end member body includes a securement feature provided along one or more of said bosses and accessible from along said distal edge of said one or more walls.

12. A rail spring assembly dimensioned for use in an associated suspension system of an associated rail vehicle, said rail spring assembly comprising:
   a flexible wall having a longitudinal axis and extending peripherally about said axis between first and second flexible wall ends such that a spring chamber for containing a quantity of pressurized gas is at least partially defined by said flexible wall;
   a first end member secured across said first flexible wall end of said flexible wall, said first end member including a first end member body formed from a polymeric material and having a longitudinal axis extending between first and second body ends, said first end member body including:
- an end wall disposed along said first body end and extending transverse to said longitudinal axis, said end wall including an interior end surface and an exterior end surface facing away from said interior end surface;
- an outer side wall extending longitudinally from along said end wall toward said second body end, said outer side wall including an interior side surface and an exterior surface facing away from said interior side surface with said interior end surface and said interior side surface at least partially defining an end member chamber and with said exterior end surface and said exterior side surface at least partially forming an exterior of said end member body;
- an outer peripheral wall extending radially outward from along said outer side wall toward an annular outermost peripheral edge of said end member body, said outer peripheral wall dimensioned to abuttingly engage said flexible wall; and,
- a plurality of gusset walls disposed along said exterior of said end member body, said plurality of gusset walls extending between and operatively interconnecting said outer side wall and said outer peripheral wall and thereby buttressing at least said outer peripheral wall against loads applied by said flexible wall.

13. A suspension system of a rail vehicle, said suspension system comprising:
- a pressurized gas system including a pressurized gas source; and,
- at least one rail spring assembly according to claim 12 operatively connected with said pressurized gas system such that said spring chamber of said at least one rail spring assembly can be selectively placed in fluid communication with the pressurized gas source.

14. A rail spring assembly according to claim 12 further comprising a second end member secured across said second flexible wall end of said flexible wall and disposed in axially spaced relation to said first end member.

15. A rail spring assembly according to claim 14 further comprising a jounce bumper disposed within said spring chamber and secured along one of said first end member and second end member.

16. A rail spring assembly according to claim 15 further comprising a bearing plate disposed within said spring chamber and secured along the other of said first end member and said second end member such that said bearing plate can substantially inhibit contact of said jounce bumper with said other of said first end member and said second end member under conditions of use of said rail spring assembly.

17. A rail spring assembly according to claim 14, wherein said second end member includes a second end member body formed from a polymeric material and having a longitudinal axis extending between first and second body ends, said second end member body including:
- an end wall disposed along said first body end and extending transverse to said longitudinal axis, said end wall including an interior end surface and an exterior end surface facing away from said interior end surface;
- an outer side wall extending longitudinally from along said end wall toward said second body end, said outer side wall including an interior side surface and an exterior surface facing away from said interior side surface with said interior end surface and said interior side surface at least partially defining an end member chamber and with said exterior end surface and said exterior side surface at least partially forming an exterior of said end member body;
- an outer peripheral wall extending radially outward from along said outer side wall, said outer peripheral wall dimensioned to abuttingly engage said flexible wall; and,
- a plurality of gusset walls disposed along said exterior of said end member body, said plurality of gusset walls extending between and operatively interconnecting said outer side wall and said outer peripheral wall and thereby buttressing at least said outer peripheral wall against loads applied by said flexible wall.

18. A rail spring assembly according to claim 12 further comprising a cover wall extending along and at least partially covering at least a portion of at least two of said plurality of gusset walls of said first end member.

19. A rail spring assembly dimensioned for use in an associated suspension system of an associated rail vehicle, said rail spring assembly comprising:
- a flexible wall having a longitudinal axis and extending peripherally about said axis between first and second flexible wall ends such that a spring chamber for containing a quantity of pressurized gas is at least partially defined by said flexible wall;
- first and second end members secured across respective ones of said first and second flexible wall ends of said flexible wall, said first and second end members each including an end member body formed from a polymeric material and having a longitudinal axis extending between first and second body ends, said end member bodies including:
  - an end wall disposed along said first body end and extending transverse to said longitudinal axis, said end wall including an interior end surface and an exterior end surface facing away from said interior end surface;
  - an outer side wall extending longitudinally from along said end wall toward said second body end, said outer side wall including an interior side surface and an exterior surface facing away from said interior side surface with said interior end surface and said interior side surface at least partially defining an end member chamber and with said exterior end surface and said exterior side surface at least partially forming an exterior of said end member body;
  - an outer peripheral wall extending radially outward from along said outer side wall toward an annular outermost peripheral edge of said end member body, said outer peripheral wall dimensioned to abuttingly engage said flexible wall; and,
  - a plurality of gusset walls disposed along said exterior of said end member body, said plurality of gusset walls extending between and operatively interconnecting said outer side wall and said outer peripheral wall and thereby buttressing at least said outer peripheral wall against loads applied by said flexible wall;
- a jounce bumper disposed within said spring chamber and secured along one of said first and second end members; and,
- a bearing plate disposed within said spring chamber and secured along the other of said first and second end members such that said bearing plate can substantially inhibit contact of said jounce bumper with said other of said first and second end members under conditions of use of said rail spring assembly.

20. A rail spring assembly according to claim 19, wherein at least one of said end member bodies includes an outer support wall disposed radially outward from said outer side wall and extending axially from along said outer peripheral wall in a direction away from said end wall and dimensioned to abuttingly engage said flexible wall with at least one of said outer peripheral wall and said outer support wall at least partially defining said annular outermost peripheral edge of said at least one of said end member bodies.

* * * * *